United States Patent Office 3,492,236
Patented Jan. 27, 1970

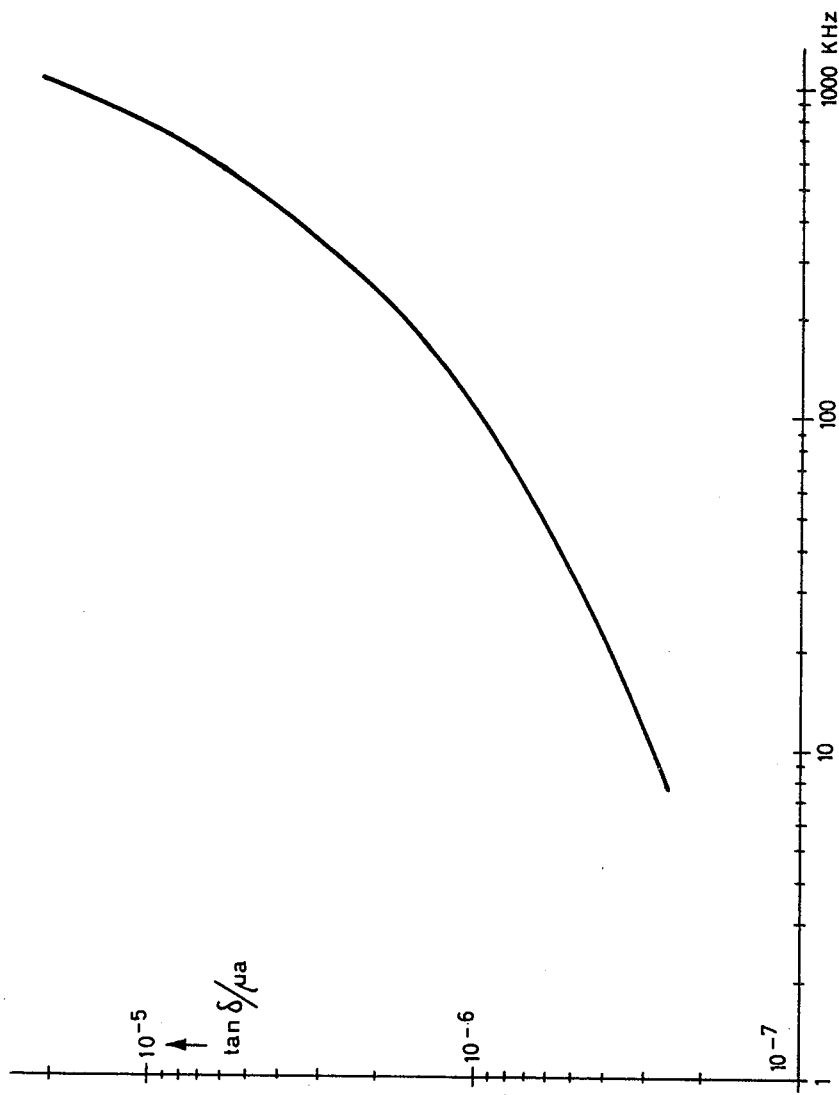

3,492,236
FERROMAGNETIC CORE AND PROCESS
FOR ITS PRODUCTION
Erich Ross, Munich, Germany, assignor to Siemens
Aktiengesellschaft, a corporation of Germany
Continuation of application Ser. No. 383,163, July 16,
1964. This application June 26, 1968, Ser. No. 744,609
Claims priority, application Germany, July 26, 1963,
S 86,393; Aug. 2, 1963, S 86,521
Int. Cl. C04b 35/38; H01f 1/34
U.S. Cl. 252—62.59                                    1 Claim

ABSTRACT OF THE DISCLOSURE

The loss factor of manganese zinc ferrite is improved by adding 0.2 to 3% by weight of tin, titanium, or mixtures thereof to the ferrite forming ingredients heating the resulting mixture to 800–900° C., grinding said mixture with about 0.1% by weight of calcium carbonate, and then finally sintering the resulting composition in an inert atmosphere at about 1,200° C.

---

This application is a continuation of application Ser. No. 383,163, filed July 16, 1964, now abandoned.

The invention relates to a ferromagnetic core of manganese-zinc-ferrite, having a low loss factor tan $\delta/\mu_a$ with reference to the permeability at low frequencies, and also to a process for its production.

Manganese-zinc-ferrite, which consists essentially of oxides of iron, manganese and zinc and has Spinel structure, is used as a ferromagnetic, for example, for increasing the inductance of electrical coils.

Such manganese-zinc-ferrites are understood to be distinguished by a high permeability and low losses, which exist also at low frequencies. The advantages of such ferrites over ferromagnetic alloys also include the fact that such oxide-ceramic material has a considerably higher electrical resistance than ferromagnetic alloys. For this reason, the use of manganese-zinc-ferrites is especially advantageous in applications involving high frequencies in the kilocycle range and above.

It is a known practice, for a loss reduction in manganese-zinc-ferrites, to add to the initial substances such as $Fe_2O_3$, MnO and ZnO, with which are mixed in a highly pure state, calcium oxide or compounds yielding calcium oxide, such as calcium carbonate, in small amounts, for example, of less than 1% by weight. It is also a known practice to combine the addition of calcium oxide with an addition of small amounts of silicon oxide. In this manner a further improvement takes place of the ferromagnetic properties of manganese-zinc-ferrites at higher frequencies of, for example, 100 kilocycles. Thus, a manganese-zinc-ferrite with a composition of 54 mol. percent iron oxide, 35 mol. percent manganese oxide and 11 mol. percent zinc oxide, and with 0.2% by weight CaO and 0.02% by weight $SiO_2$, has a specific electrical resistance of $\zeta=600$ ohm cm. This small amount of 0.02% by weight $SiO_2$ often occurs as a result of impurities of the ferrite-forming oxides, since a purity of about 99.98% is generally not exceeded in order to reduce costs.

An object of the invention is the further reduction of the losses of manganese-zinc-ferrites. Especially to be reduced is the fundamental loss, that is the loss factor tan $\delta/\mu_a$ for lowest frequencies ($f\rightarrow 0$). Through the reduction of these basic losses there are also reduced the total losses of the ferromagnetic materials, which are made up largely of such basic losses, the eddy losses, hysteresis and residual losse.

The invention resides in the concept that into the ferrite grid there are incorporated 0.2–3% by weight of oxides of metals of the IVth group of the Periodic System with an atomic radius of 1.45–1.58 and an ion radius of 0.64–0.74. Metals of this type are tin (Sn) and titanium (Ti). Thus, preferably 0.2–2% by weight, especially 0.5–1% by weight, of tin oxide is incorporated in the ferrite grid. Instead of tin oxide there can also be incorporated 0.2 to 1% by weight, in particular 0.3 to 0.7% by weight, of titanium oxide. The best results are attained when both tin oxide and also titanium oxide are incorporated in the ferrite grid in the quantitative ratios stated. An additional improvement of the desired properties is achieved if 0.02 to 0.1% by weight of calcium oxide is incorporated in the ferrite grid.

The process according to the invention is characterized by the feature that the incorporation of the above-mentioned metal oxides is accomplished by a method such that the cooling of the sinter product, which consists of manganese-zinc-ferrite with the additions of tin oxide, titanium oxide and/or calcium oxides, takes place slowly, especially in an inert atmosphere such as nitrogen or the like. Thus, for example, cooling may take place at a rate of 100° C./hr. in pure nitrogen.

The use of tin oxide and titanium oxide as additives in manganese-zinc-ferrites heretofore has been known merely for the improvement of the temperature coefficient of the permeability. The specialist in this field was of the opinion that these additives, even in conjunction with calcium oxide, do not contribute in any appreciable degree to a lowering of the losses. The invention overcomes this prejudice. It is contemplated that the tin oxide is incorporated differently than, for example, calcium oxide, in the ferrite grid. While, as is well known, calcium oxide is deposited at the grain boundaries and there forms a poorly conducting layer for the increasing of the specific electrical resistance, which especially reduces the eddy current losses, the tin and/or titanium ions replace bivalent iron ions in the crystal grid. Thereby the possibility of electron exchange between bivalent and trivalent iron ions is reduced; and the basic losses are reduced. The process according to the invention leads to this incorporation of the tin and/or titanium ions.

In the process of the invention, to the initial materials, for example, to the oxides of iron, manganese and zinc, there is added tin oxide and/or titanium oxide, and possibly, calcium oxide. The mixture is ground, possibly pressed, sintered, and cooled slowly in an inert atmosphere. In place of the tin or titanium or calcium oxide there can be used also compounds which yield these oxides in the sintering process. The cooling speed of the sintered product amounts to about 100° C./hr.

Very favorable properties are achieved in a further development of the invention, if the pure initial materials, namely, oxides, carbonates, or like compounds yielding oxides through thermal decomposition, are mixed with tin oxide and/or titanium oxide and only after a thermal preliminary treatment of a so-called calcining at about 800 to 900° C., are mixed during a wet grinding process with calcium oxide or calcium carbonate. After a thorough mixing and grinding of these substances, in a few hours the ground material is pressed and subjected to sintering at about 1200° to 1220° C. After the slow cooling of the sintered core at about 100° C./hr. there is obtained a manganese-zinc-ferrite core with excellent ferromagnetic properties.

The figure of the drawing illustrates the loss factor tan $\delta/\mu_a$ with respect to frequency.

In the following, with the aid of examples, there are described the great reductions of the losses, or the increases of the electrical resistances of the manganese-zinc-ferrite core according to the invention.

EXAMPLE 1

There are mixed with 1% by weight of $SnO_2$:

53 mol percent $Fe_2O_3$
30 mol percent MnO
17 mol percent ZnO which mixture is calcined for about an hour at 850° C. and thereupon broken up by grinding. Subsequently there is admixed therewith for two hours 0.1% by weight $CaCO_3$, following which the ground material is pressed. The pressed cores are thereupon sintered for two hours at 1200° C. in a nitrogen atmosphere containing only 7% by volume of oxygen. After slow cooling at a rate of about 100° C./hr., this manganese-zinc-ferrite core has an initial permeability of $\mu_a=2200$ and a specific electrical resistance of $\zeta=900$ ohm cm. Moreover there were measured the following loss factors $$\tan \delta/\mu_a = 0.35 \times 10^{-6} \text{ (at } f \to 0\text{)}$$
$$= 1.5 \times 10^{-6} \text{ (at } f = 100 \text{ kc.)}$$

EXAMPLE 2

Manganese-zinc-ferrites produced in the same manner, without the tin additive according to the invention, show an initial permeability of $\mu_a=1800$ and a specific electrical resistance of $\zeta=650$ ohm cm. the following loss factors:

$$\tan \delta/\mu_a = 0.6 \times 10^{-6} \text{ (at } f \to 0\text{)}$$
$$= 2.1 \times 10^{-6} \text{ (at } f = 100 \text{ kc.)}$$

An addition of the tin oxide, without the combination according to the invention, with a slow cooling in an inert atmosphere does not lead to the above-mentioned highly improved magnetic values, so that this process step in combination with the addition according to the invention presents a further development of the invention, which was not obvious to a person skilled in the art.

EXAMPLE 3

To a mixture of:

53 mol percent pure $Fe_2O_3$
28 mol percent pure MnO
19 mol percent pure ZnO there are admixed $SnO_2$ and/or $TiO_2$ along with $CaCO_3$ and the specific resistance is measured of the cores produced from it, which are sintered at 1220° C. for three hours in 7 vol. percent oxygen-containing nitrogen and thereupon in pure nitrogen are slowly cooled at a rate of about 100° C./hr. There resulted the following specific electrical resistances:

| $CaCO_3$ by wt. percent | $SnO_2$ by wt. percent | $TiO_2$ by wt. percent | $\zeta$ Ohm cm. |
| --- | --- | --- | --- |
| 0 | 0 | 0 | 4 |
| 0 | 0.9 | 0 | 10 |
| 0 | 0 | 0.5 | 11 |
| 0 | 0.45 | 0.25 | 12 |
| 0 | 0.9 | 0.5 | 25 |
| 0.1 | 0 | 0 | 350 |
| 0.1 | 0.9 | 0 | 600 |
| 0.1 | 0 | 0.5 | 1,200 |
| 0.1 | 0.45 | 0.25 | 1,600 |
| 0.1 | 0.9 | 0.5 | 1,500 |

EXAMPLE 4

There is produced a mixture of:
53.5 mol. percent $Fe_2O_3$
29.3 mol. percent MnO
17.2 mol. percent ZnO without $TiO_2$ and a similar mixture with 0.7 mol. percent $TiO_2$ and 16.5 mol. percent ZnO, thermally pretreated for one hour at 850° C. Thereupon there is admixed in a wet state 0.1% by weight $CaCO_3$ for two hours. The ring cores pressed therefrom are sintered at 1200° C. for 3 hours in nitrogen atmosphere containing 7 vol. percent of oxygen and thereupon cooled at about 100° C./hr. in pure nitrogen. The following values were measured of the sintered cores:

With $TiO_2$: $\mu_a=1780$, $\zeta=1400$ ohm. cm., $$\tan \delta/\mu_a = 1.1 \times 10^{-6} \text{ (at 100 kc.)}$$
$$= 5 \times 10^{-6} \text{ (at 500 kc.)}$$

Without $TiO_2$: $\mu_a=1600$, $\zeta=550$ ohm. cm., $$\tan \delta/\mu_a = 1.7 \times 10^{-6} \text{ (at 100 kHz.)}$$
$$= 9 \times 10^{-6} \text{ (at 500 kHz.)}$$

EXAMPLE 5

A manganese-zinc-ferrite core as given in Example 4 of the composition:

54 mol. percent $Fe_2O_3$
28.3 mol. percent MnO
17 mol. percent ZnO
0.7 mol. percent $TiO_2$ which likewise was wet-ground, after the thermal preliminary treatment, with 0.1% by weight of $CaCO_3$ and slowly cooled in pure nitrogen shows a permeability of $\mu a$ = between 1700 and 1900 at a specific electrical resistance $\zeta=1000$ ohm cm. In the figure the loss factor $\tan \delta/\mu a$ is represented.

I claim as my invention:

1. The method of improving the loss factor of a manganese zinc ferrite at low frequencies which comprises providing a manganese zinc ferrite composition which after sintering at about 1200° C. in an inert atmosphere would have a loss factor of about $6.0 \times 10^{-6}$ at frequncies approaching zero and a loss factor of about $2.1 \times 10^{-6}$ at 100 kilocycles, adding from 0.2 to 3% by weight of an additive oxide selected from the group consisting of the oxides of tin, titanium and mixtures thereof to said composition, combining said additive oxides with the ferrite forming composition, heating the combined mixture to a temperature of 800 to 900° C., and grinding said mixture with about 0.1% by weight calcium carbonate, sintering the resulting composition in an inert atmosphere at about 1200° C., and cooling to produce a composition having a loss factor of about $0.35 \times 10^{-6}$ at frequencies approaching zero and a loss factor of about $1.5 \times 10^{-6}$ at a frequency of 100 kilocycles, the improvement in said loss factor being due essentially to the presence of said additive oxide.

References Cited

UNITED STATES PATENTS 3,375,196  3/1968  Muramori et al. ____ 252—62.63
3,106,534  10/1963  Akashi et al. _____ 252—62.59

ROBERT D. EDMONDS, Primary Examiner

U.S. Cl. X.R.

252—62.62, 62.63